US011966085B2

(12) United States Patent
Lu et al.

(10) Patent No.: US 11,966,085 B2
(45) Date of Patent: Apr. 23, 2024

(54) OPTICAL TRANSCEIVER (71) Applicant: Delta Electronics, Inc., Taoyuan (TW)

(72) Inventors: Chen-Mao Lu, Taoyuan (TW);
Wei-Chan Hsu, Taoyuan (TW);
Chun-Yen Chen, Taoyuan (TW)

(73) Assignee: DELTA ELECTRONICS, INC.,
Taoyuan (TW)

( * ) Notice: Subject to any disclaimer, the term of this patent is extended or adjusted under 35 U.S.C. 154(b) by 253 days.

(21) Appl. No.: 17/325,030

(22) Filed: May 19, 2021

(65) Prior Publication Data
US 2022/0137301 A1 May 5, 2022

(30) Foreign Application Priority Data

Nov. 3, 2020 (CN) .......................... 202011207422.8

(51) Int. Cl.
*G02B 6/36* (2006.01)
(52) U.S. Cl.
CPC ........... *G02B 6/3644* (2013.01); *G02B 6/368* (2013.01)
(58) Field of Classification Search
CPC .............................. G02B 6/3644; G02B 6/368
See application file for complete search history.

(56) References Cited

U.S. PATENT DOCUMENTS

| | | |
|---|---|---|
| 6,795,632 B1 | 9/2004 | Knapp et al. |
| 2011/0103797 A1* | 5/2011 | Oki ........................ G02B 6/428 398/79 |
| 2011/0194824 A1 | 8/2011 | Andrews |
| 2012/0237223 A1* | 9/2012 | Matsui ................. G02B 6/4243 398/139 |
| 2014/0193119 A1* | 7/2014 | Isenhour .................. G02B 6/36 156/221 |
| 2015/0293315 A1* | 10/2015 | Oki ........................ G02B 6/403 385/92 |
| 2017/0199345 A1* | 7/2017 | Lu ........................ G02B 6/4472 |
| 2020/0278504 A1* | 9/2020 | Chang ................ G02B 6/38875 |

FOREIGN PATENT DOCUMENTS

CN 202003054 U 10/2011

OTHER PUBLICATIONS

Office Action dated Jun. 8, 2021 of the corresponding Taiwan patent application No. 109138227.

* cited by examiner

*Primary Examiner* — Sung H Pak
*Assistant Examiner* — Hoang Q Tran
(74) *Attorney, Agent, or Firm* — Chun-Ming Shih; HDLS IPR SERVICES (57) ABSTRACT

An optical transceiver includes an input assembly, an output port, a fiber patch panel, multiple first optical fibers and multiple second optical fibers. The input assembly is arranged on a circuit board and has a first input port and a second input port. The fiber patch panel is arranged between the input assembly and the output port, and has multiple first fiber patch slots and multiple second fiber patch slots. The first optical fibers are connected to the first input port and the output port. The first optical fiber passes through the first fiber patch slot and the second fiber patch slot. The second optical fibers are connected to the second input port and the output port. The second optical fiber passes through the first fiber patch slot and the second fiber patch slot. The second fiber patch slot accommodates the first optical fiber and the second optical fiber.

20 Claims, 5 Drawing Sheets

OPTICAL TRANSCEIVER

BACKGROUND OF THE DISCLOSURE

Technical Field

This disclosure is related to an optical transceiver and in particular to an optical transceiver having a fiber patch panel for guiding the optical fibers to bend.

Background

A related optical transceiver has a circuit board. The circuit board is provided with a pair of input ports arranged side by side thereon and an output port arranged opposite to the pair of input ports. Each input port has a plurality of input interfaces and the input interfaces are arranged in a line, and the output port has a plurality output interfaces corresponding respectively to the input interfaces arranged in a line. Therefore, each of the input interfaces may be connected with the corresponding output interface via an optical fiber, and the optical fibers are disposed substantially straight without overbending.

However, a new type of the optical transceiver is provided with output ports arranged in two lines sided by side for reducing the size thereof, and the optical fibers are therefore overlapped and overbent.

In views of this, in order to solve the above disadvantage, the inventor studied related technology and provided a reasonable and effective solution in this disclosure.

SUMMARY OF THE DISCLOSURE

This disclosure provides an optical transceiver having a fiber patch panel therein for guiding the optical fibers to bend and preventing the optical fibers from overbending.

This disclosure provides an optical transceiver having an input assembly, an output port, a fiber patch panel, a plurality of first optical fibers and a plurality of second optical fibers. The input assembly is arranged on a circuit board, and the input assembly has a first input port and a second input port. The fiber patch panel is arranged between the input assembly and the output port, and has a plurality of first fiber patch slots and a plurality of second fiber patch slots. The first optical fibers are respectively connected to the first input port and the output port, and one or all of the first optical fibers pass through one of the first fiber patch slots and one of the second fiber patch slots. The second optical fibers are respectively connected to the second input port and the output port, and one or all of the second optical fibers pass through one of the first fiber patch slots and one of the second fiber patch slots. One of the first optical fibers and one of the second optical fibers are accommodated in one of the second fiber patch slots.

According to the optical transceiver of this disclosure, one of the first fiber patch slots accommodates two of the first optical fibers, two of the second optical fibers, or one of the first optical fibers and one of the second optical fibers. The first fiber patch slots and the second fiber patch slots are unequal in number. At least one first guiding surface is disposed on an internal wall of one of the first fiber patch slots close to the second fiber patch slots, and the first guiding surface is a curved surface or an inclined surface; or at least one second guiding surface is disposed on an internal wall of one of the second fiber patch slots close to the first fiber patch slots, and the second guiding surface is a curved surface or an inclined surface.

This disclosure provides another optical transceiver having a circuit board, an input assembly, an output port, a fiber patch panel, a plurality of first optical fibers and a plurality of second optical fibers. The input assembly is arranged on the circuit board, the input assembly has a first input port and a second input port, wherein the first input port has a plurality of first input interfaces, the second input port has a plurality of second input interfaces. The output port has a plurality of first output interfaces and a plurality of second output interfaces. A horizontal position of each of the first output interfaces is different from a horizontal position of a corresponding second output interfaces when using a surface of the circuit board as a horizontal reference. The fiber patch panel is arranged between the input assembly and the output port and has a plurality of first fiber patch slots and a plurality of second fiber patch slots. The first optical fibers are used for correspondingly connecting one of first input interfaces with one of the first output interfaces, and one or all of the first optical fibers pass through one of the first fiber patch slots and one of the second fiber patch slots. The second optical fibers are used for correspondingly connecting one of the second input interfaces with one of the second output interfaces, and one or all of the second optical fibers pass through one of the first fiber patch slots and one of the second fiber patch slots; wherein, one of the second fiber patch slots accommodates one of the first optical fibers and one of the second optical fibers.

According to the optical transceiver of this disclosure, a radius of curvature of one or all of the first optical fibers or the second optical fibers is equal to or greater than 5 mm. One of the first fiber patch slots accommodates two of the first optical fibers, two of the second optical fibers, or one of the first optical fibers and one of the second optical fibers. Each of the first optical fibers or each of the second optical fibers linearly enters into the corresponding first fiber patch slot or linearly departs from the corresponding second fiber patch slot. The first fiber patch slots and the second fiber patch slots are unequal in number. At least one first guiding surface is disposed on an internal wall of one of the first fiber patch slots close to the second fiber patch slots, and the first guiding surface is a curved surface or an inclined surface. A at least one second guiding surface is disposed on an internal wall of one of the second fiber patch slots close to the first fiber patch slots, and the second guiding surface is a curved surface or an inclined surface. An end of one of the first optical fibers and the corresponding first input interface are disposed integrally in the first input port; or an end of one of the second optical fibers and the corresponding second input interface are disposed integrally in the second input port.

This disclosure provides further another optical transceiver having a circuit board, an input assembly, an output port, a fiber patch panel, a plurality of first optical fibers and a plurality of second optical fibers. The input assembly is arranged on the circuit board, the input assembly has a first input port and a second input port, wherein the first input port has a plurality of first input interfaces, and the second input port has a plurality of second input interfaces. The output port has a plurality of the first output interfaces and a plurality of second output interfaces. A virtual line connecting the first output interface and the corresponding second output interface is substantially perpendicular to a surface of the circuit board. The fiber patch panel is arranged between the input assembly and the output port, and has a plurality of first fiber patch slots and a plurality of second fiber patch slots. The first optical fibers are used for correspondingly connecting one of the first input interfaces and one of the first output interfaces, and one of the first optical fibers passes through one of the first fiber patch slots and one of the second fiber patch slots. The second optical fibers are used for correspondingly connecting one of the second input interfaces and one of the second output interfaces, and one of the second optical fibers passes through one of the first fiber patch slots and one of the second fiber patch slots. One of the second fiber patch slots accommodates one of the first optical fibers and one of the second optical fibers.

A radius of curvature of one or all of the first optical fibers or the second optical fibers is equal to or greater than 5 mm. One of the first fiber patch slots accommodates at least two of the first optical fibers, at least two of the second optical fibers, or one of the first optical fibers and one of the second optical fibers. Each of the first optical fibers or each of the second optical fibers linearly enters into the corresponding first fiber patch slot or linearly departs from the corresponding second fiber patch slot. The first fiber patch slots and the second fiber patch slots are unequal in number. At least one first guiding surface is disposed on an internal wall of one of the first fiber patch slots close to the second fiber patch slots, and the first guiding surface is a curved surface or an inclined surface. At least one second guiding surface is disposed on an internal wall of one of the second fiber patch slots close to the first fiber patch slots, and the second guiding surface is a curved surface or an inclined surface. An end of one of the first optical fibers and the corresponding first input interface are disposed integrally in the first input port; or an end of one of the second optical fibers and the corresponding second input interface are disposed integrally in the second input port.

BRIEF DESCRIPTION OF DRAWINGS

This disclosure can be more fully understood by reading the following detailed description of the embodiment, with reference made to the accompanying drawings.

DETAILED DESCRIPTION

Figure 1:
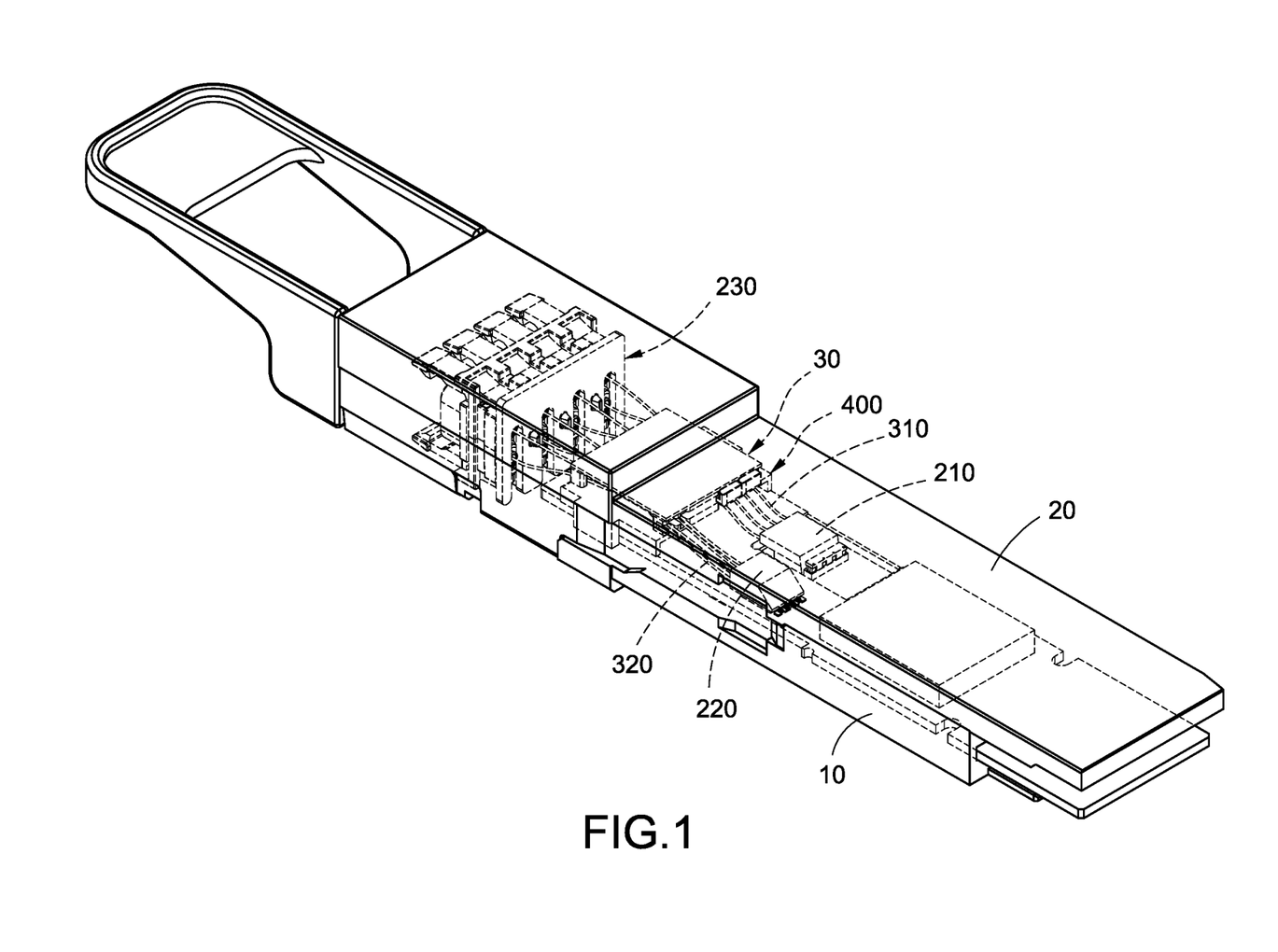
FIG. 1 is a perspective view showing an optical transceiver of the first embodiment of this disclosure.
Figure 2:
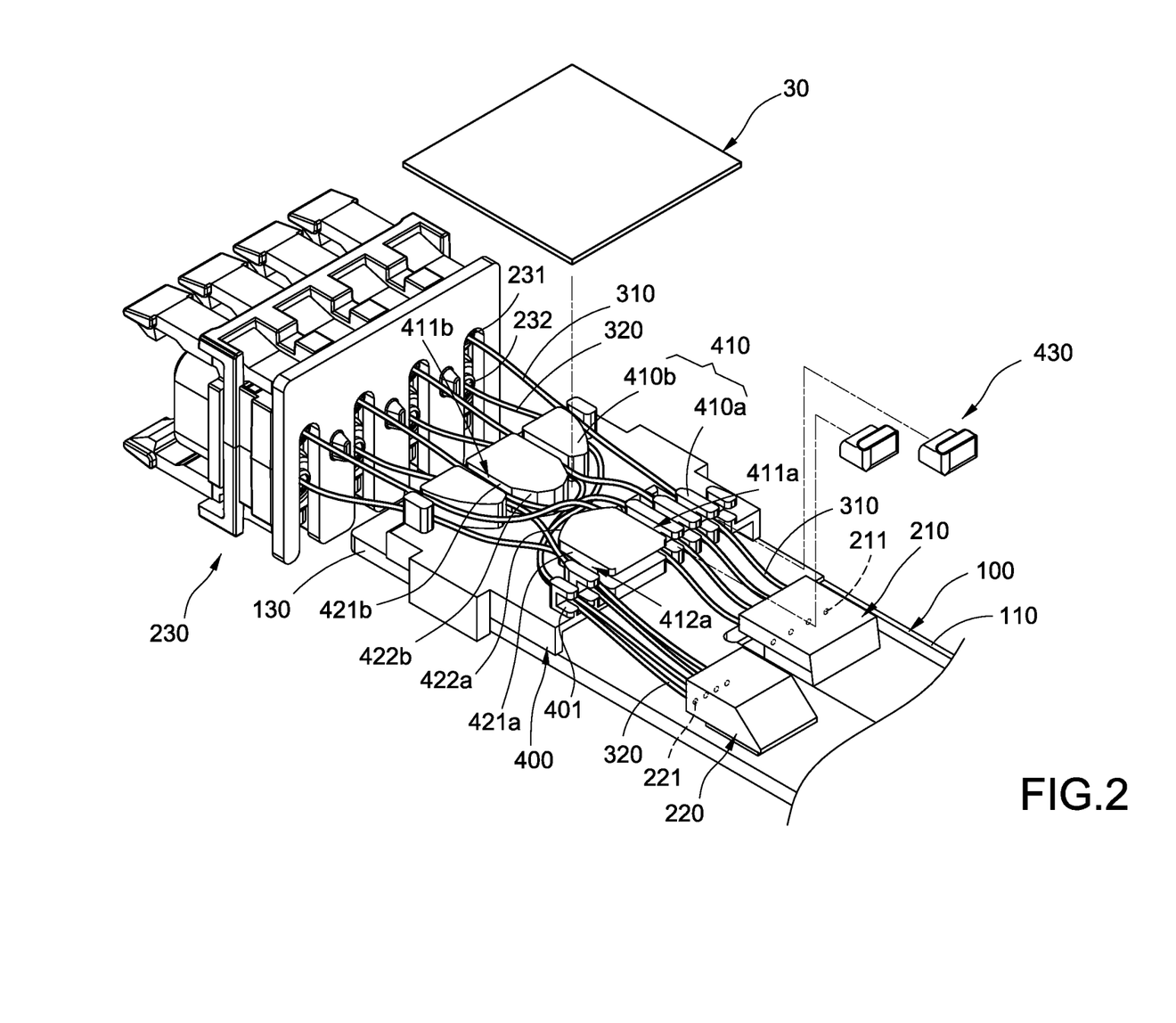
FIG. 2 is a perspective view showing a part of the optical transceiver of the first embodiment of this disclosure.
Figure 3:
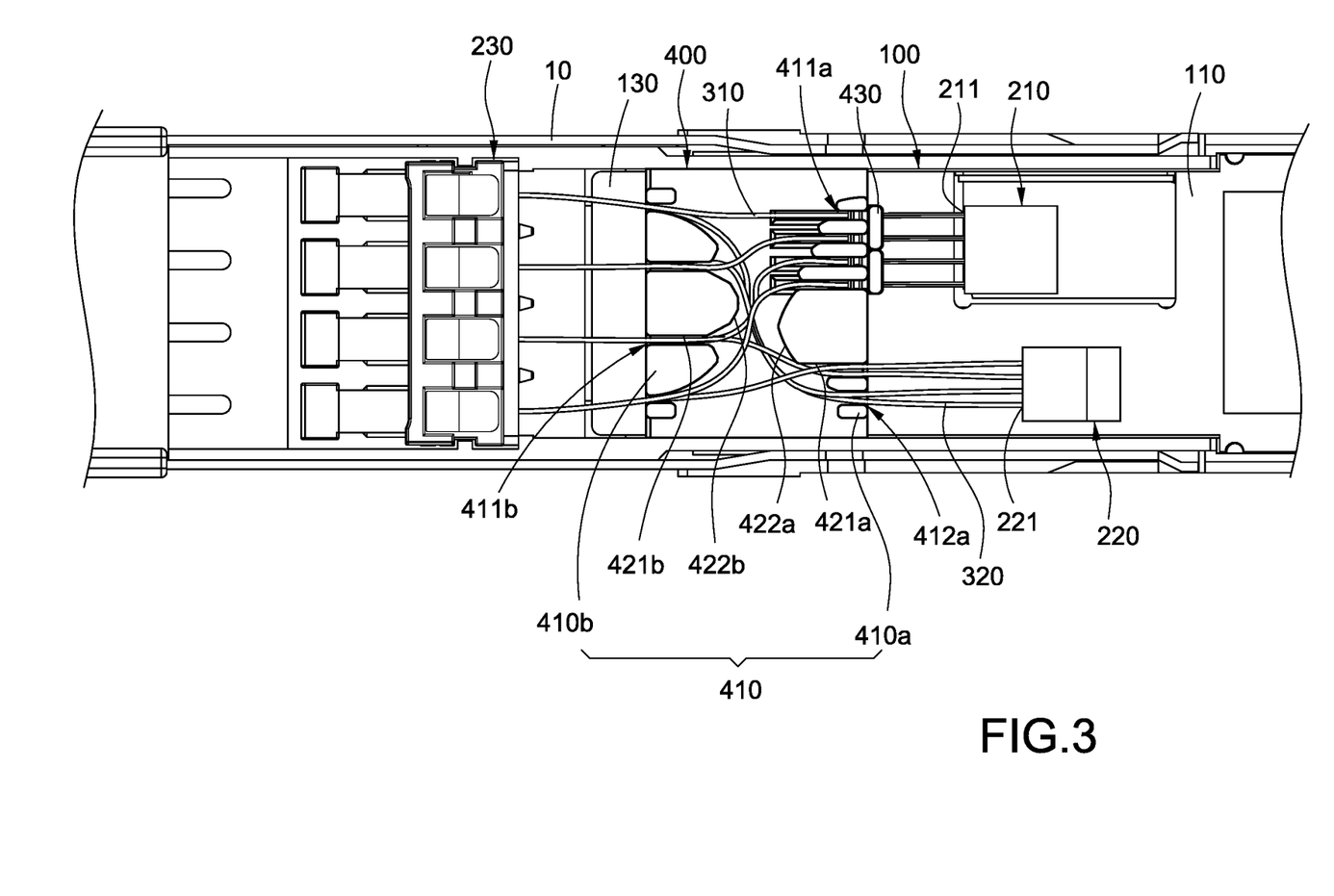
FIG. 3 is a front view showing the optical transceiver of the first embodiment of this disclosure.

According to the first embodiment of an optical transceiver of this disclosure shown in FIGS. 1 to 3, the optical transceiver at least has an input assembly (or receiver assembly), an output port 230, a fiber patch panel 400, a plurality of first optical fibers 310 and a plurality of second optical fibers 320. The input assembly has a first input port 210 and a second input port 220. The first input port 210 and the second input port 220 are preferably arranged on a circuit board 100. The first input port 210, the second input port 220, the output port 230, the fiber patch panel 400, the first optical fiber 310 and the second optical fiber 320 are accommodated in a base 10. The base 10 is a top-opened flat longitudinal box. The fiber patch panel 400 is arranged between the input assembly and the output port 230. The fiber patch panel 400 has a plurality of first fiber patch slots 411a/412a and a plurality of second fiber patch slots 411b. The first optical fibers 310 are respectively connected to the first input port 210 and the output port 230, and one or all of the first optical fibers 310 pass through one of the first fiber patch slots 411a and one of the second fiber patch slots 411b. The second optical fibers 320 are respectively connected to the second input port 220 and the output port 230, and one or all of the second optical fibers 320 pass through one of the first fiber patch slots 412a and one of the second fiber patch slots 411b.

The circuit board 100 is of a longitudinal shape and two ends of the circuit board 100 are a receiving (or input) end 110 and a transmitting (or output) end 130, respectively. The first input port 210, the second input port 220, the output port 230 and the fiber patch panel 400 are preferably arranged on the same surface of the circuit board 100.

The first input port 210 and the second input port 220 are arranged on the receiving end 110 of the circuit board 100 and disposed side by side along a lateral direction of the circuit board 100. The first input port 210 has multiple first input interfaces 211 sequentially arranged along a direction parallel to the circuit board 100 (such as parallel to a width of circuit board 100), and the second input port 220 has multiple second input interfaces 221 sequentially arranged along a direction parallel the circuit board 100 (such as parallel to the width of circuit board 100).

The output port 230 is arranged correspondingly to the transmitting end 130 of the circuit board 100. Specifically, the output port 230 is disposed on the transmitting end 130 or outside of the transmitting end 130 along a longitudinal direction of the circuit board 100. The output port 230 has a plurality of first output interfaces 231 and a plurality of second output interfaces 232 disposed side by side in two lines parallel to the circuit board 100 (such as parallel to the width of circuit board 100), the first output interfaces 231 are respectively disposed over and aligned to the second output interfaces 232. A connecting line (virtual line) between one or all of the first output interfaces 231 and the corresponding second output interface 232 is substantially perpendicular to the surface of the circuit board 100, and the first output interfaces 231 and the second output interfaces 232 are disposed to face the first input interfaces 211 and the second input interfaces 221. When using the surface of the circuit board 100 as a horizontal reference, a horizontal position of one or all of the first output interfaces 231 is different from a horizontal position of the corresponding second output interface 232.

Each first input interface 211 is connected with the corresponding first output interface 231 via a first optical fiber 310, and each second input interface 221 is connected with the corresponding second output interface 232 via a second optical fiber 320. An end of one or all of the first optical fibers 310 and the corresponding first input interface 211 may be formed integrally (or one piece formed) in the first input port 210. An end of one or all of the second optical fibers 320 and the corresponding second input interface 221 may be formed integrally (or one piece formed) in the second input port 220.

The fiber patch panel 400 is arranged between the receiving end 110 and the transmitting end 130 of the circuit board 100. A plurality of fiber-guiding blocks 410 are protruding from the fiber patch panel 400, a guiding surface is formed on a side surface of each fiber-guiding block 410 for the first optical fiber 310 or the second optical fiber 320 abutting against thereon and being bent, and a tolerable minimum radius of curvature of the first optical fiber 310 and the second optical fiber 320 is defined. According to this embodiment, preferably, the tolerable minimum radius of curvature of one or all of the first optical fibers 310 and the second optical fibers 320 is 5 mm. At least one first guiding surface is disposed on an internal wall of one or all of the first fiber patch slots close to the second fiber patch slots 411b. According to figures, the first guiding surface 421a may be an inclined surface, and alternatively the first guiding surface 422a may be a curved surface. At least one second guiding surface is disposed on an internal wall of one or all of the second fiber patch slots 411b close to the first fiber patch slots 411a. According to figures, the second guiding surface 421b may be an inclined surface, and alternatively the second guiding surface 422b may be a curved surface. The fiber patch panel 400 may be arranged on the base 10, circuit board 100, or arbitrary positions between the receiving end 110 and the transmitting end 130.

Specifically, the fiber-guiding blocks 410 include a plurality of first fiber-guiding blocks 410a and a plurality of second fiber-guiding blocks 410b, the first fiber-guiding blocks 410a are disposed corresponding to the first input port 210 and the second input port 220 and sequentially disposed along a lateral direction of the circuit board 100, the second fiber-guiding blocks 410b are disposed corresponding to the output port 230 and sequentially disposed along the lateral direction of the circuit board 100. The guiding surface on a side surface of the fiber-guiding block 410a is a first guiding surface 421a/422a, the guiding surface on a side surface of the second fiber-guiding block 410b is a second guiding surface 421b/422b. Each inclined first guiding surfaces 421a is extended toward the transmitting end 130 to connect with the curved first guiding surfaces 422a. Each inclined second guiding surfaces 421b is extended toward the receiving end 110 to connect with the curved second guiding surfaces 422b. The radius of curvature of each curved first guiding surface 422a may be different from the radius of curvature of each curved second guiding surface 422b, and both may be equal to or larger than the tolerable minimum radius of curvature of the first optical fibers 310 and the second optical fibers 320. According to this embodiment, the tolerable minimum radius of curvature of one or all of the first optical fibers 310 and one or all of the second optical fibers 320 is preferably 5 mm.

Furthermore, an interval between the first guiding surface 421a/422a and the corresponding second guiding surface 421b/422b along the longitudinal direction of the circuit board 100 is greater than an interval along the lateral direction, and the interval along the longitudinal direction is greater than the tolerable minimum diameter of curvature of the first optical fibers 310 and the second optical fibers 320. According to this embodiment, the tolerable minimum diameter of curvature of the first optical fibers 310 and the second optical fibers 320 is preferably 10 mm.

For example, each first optical fiber 310 and each second optical fiber 320 are bent along each corresponding curved first guiding surface 422a and each corresponding curved second guiding surface 422b.

A first fiber patch slot 411a/412a is formed between each fiber-guiding block 410 and another adjacent fiber-guiding block 410 for any of the first optical fibers 310 or any of the second optical fibers 320 passing through. According to this embodiment, a plurality of first fiber patch slots 411a/412a parallel with each other are formed between the first fiber-guiding blocks 410a, four first fiber patch slots 411a of the first fiber-guiding block 410a are aligned respectively to each first input interfaces 211 for each first optical fiber 310 passing through, the other two first fiber patch slots 412a of the first fiber-guiding block 410a are aligned respectively to each second input interfaces 221 for each second optical fibers 320 passing through.

However, scope of this disclosure is not limited to the aforementioned embodiment. The first fiber patch slot 411a/412a may selectively accommodate two first optical fibers 310, two second optical fibers 320 or one first optical fiber 310 and one second optical fiber 320. Similarly, the second fiber patch slot 411b may selectively accommodate two first optical fibers 310, two second optical fibers 320 or one first optical fiber 310 and one second optical fiber 320.

Four second fiber patch slots 411b aligned respectively to each first output interface 231 and each second input interface 221 are formed between the second fiber-guiding blocks 410b, each second fiber patch slot 411b of the second fiber-guiding block 410b is used for one first optical fiber 310 and one second optical fiber 320 passing through. In each second fiber patch slot 411b of the second fiber-guiding block 410b, the first optical fiber 310 and the second optical fiber 320 are overlapped, and the first optical fiber 310 is located under the second optical fiber 320.

According to this embodiment, one or all of the first optical fibers 310 and the second optical fibers 320 linearly enter into the first fiber patch slot 411a/412a. Moreover, one or all of the first optical fibers 310 and the second optical fibers 320 may linearly depart from each corresponding second fiber patch slot 411b.

Figure 4:
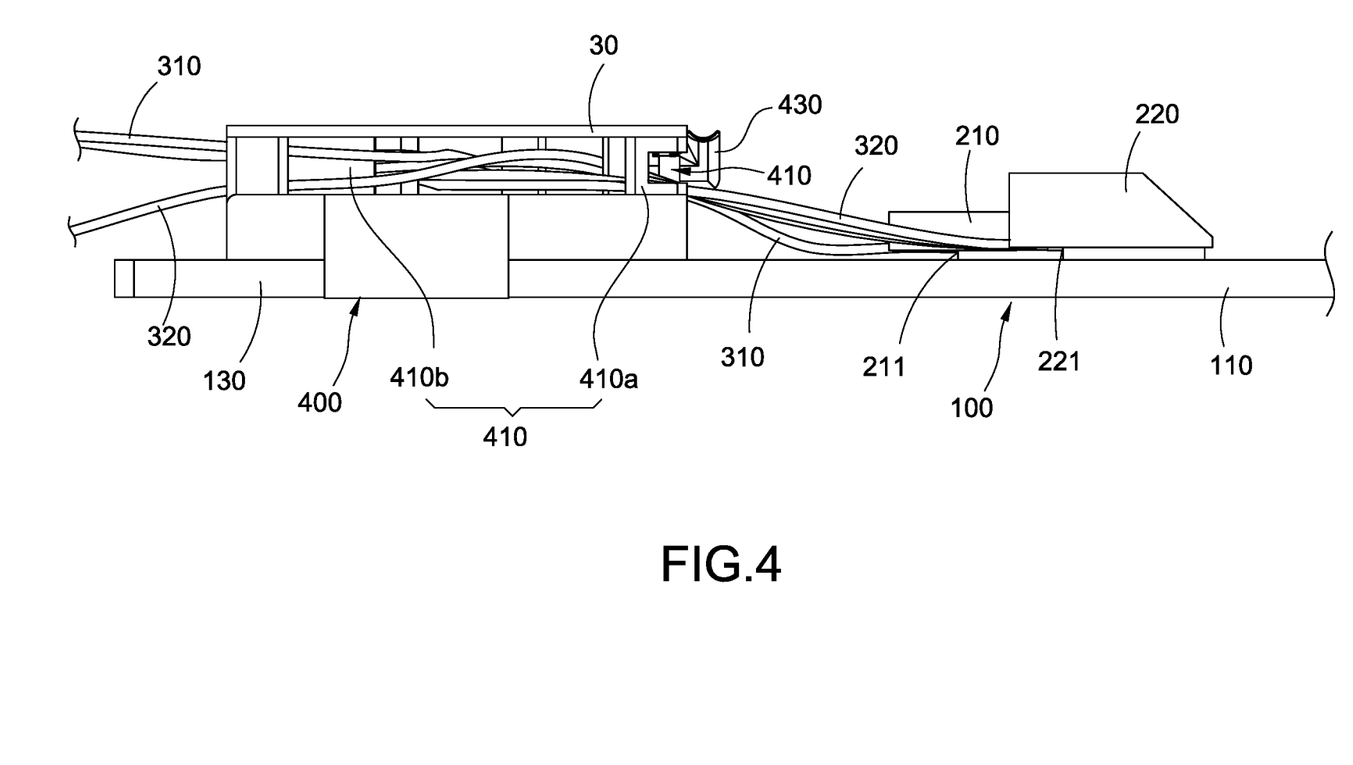
FIG. 4 is a side view showing the optical transceiver of the first embodiment of this disclosure.

According to FIGS. 2 to 4, a fiber holding block 430 is disposed in each first fiber patch slot 411a/412 to press and fix the first optical fiber 310 or the second optical fiber 320. Specifically, a clamping slot 401 is disposed on a side surface of each first fiber-guiding block 410a for fixing any one of the fiber holding blocks 430.

According to FIG. 2, furthermore, at least one heat generating element (not shown in Fig.) is arranged on the circuit board 100. According to this embodiment, the fiber patch panel 400 may be made of metal, the fiber patch panel 400 covers the heat generating element and thermally connect to the circuit board 100, and the heat generated by the heat generating element in operation may be removed. A metal case 20 is arranged to cover the circuit board 100 for closure of the base 10, the fiber patch panel 400 is thermally connected to the metal case 20, and the heat generated by the heat generating element in operation may be further dissipated via the metal case 20. Specifically, a thermal conductive pad 30 is stacked between the metal case 20 and the fiber patch panel 400 to thermally connect the fiber patch panel 400 to the metal case 20.

According to the optical transceiver of this disclosure, a fiber patch panel 400 is disposed between the first input port 210 on the receiving end 110 of the circuit board 100 and the output port 230 on the transmitting end 130 and between the second input port 220 on the receiving end 110 of the circuit board 100 and the output port 230 for winding the first optical fiber 310 and the second optical fiber 320. Thereby, a radius of curvature of one or all of the bent portion of the first optical fibers 310 and the second optical fiber 320 is equal to or greater than a tolerable minimum radius of curvature.

Figure 5:
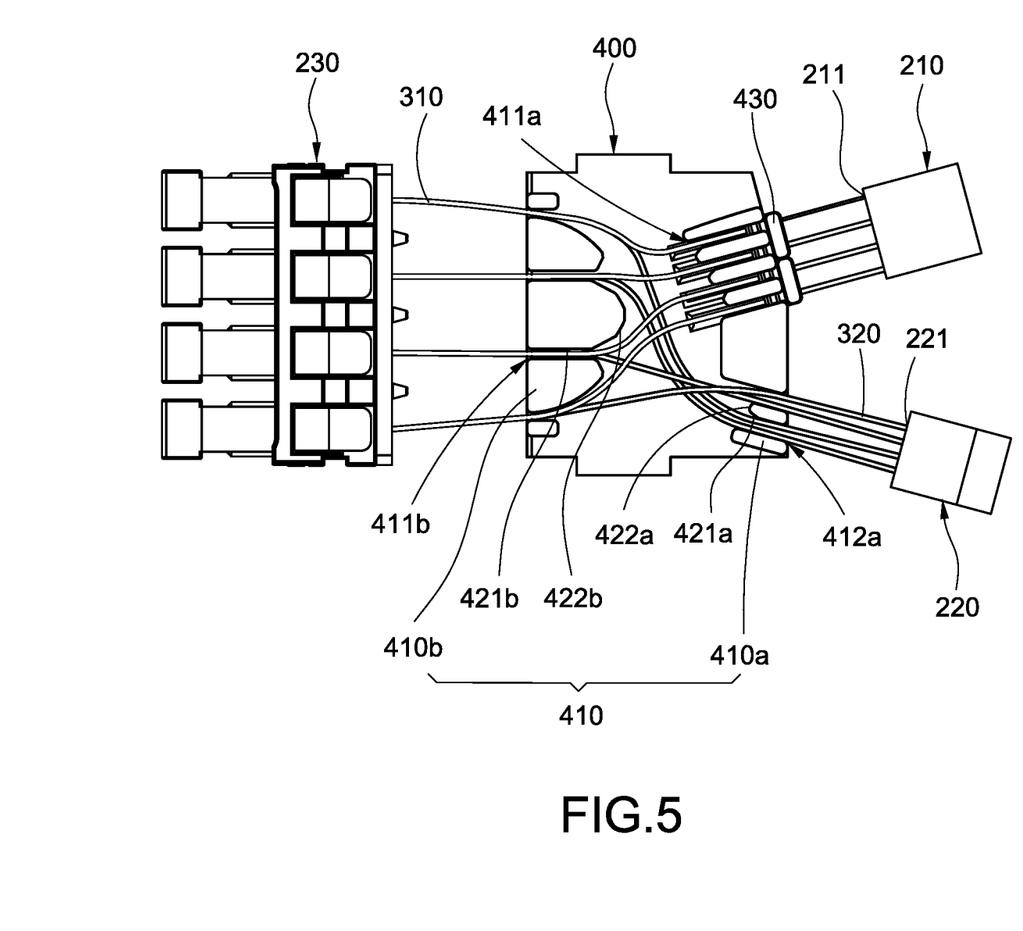
FIG. 5 is a schematic view showing the optical transceiver of the second embodiment of this disclosure.

According to FIG. 5, the second embodiment of this disclosure provides an optical transceiver. The optical transceiver at least has a first input port 210, a second input port 220, an output port 230, a fiber patch panel 400, a plurality of first optical fibers 310 and a plurality of second optical fiber 320. The first input port 210 and the second input port 220 are arranged on a circuit board 100, the base 10 is a top opened flat longitudinal box, the circuit board 100, the first input port 210, the second input port 220, the output port 230, the fiber patch panel 400, the first optical fibers 310 and the second optical fibers 320 are accommodated in the base 10. The aforementioned structure is similar to the first embodiment, and the description similar to the first embodiment is omitted for brevity. The difference between this embodiment and the first embodiment is that the first input interface 211 and the second input interface 221 are disposed unparallelly, and the curvature of bending during the first optical fiber 310 and the second optical fiber 320 extending to the output port 230 may be decreased.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of this disclosure as defined in the appended claims.

What is claimed is:

1. An optical transceiver, comprising:
    an input assembly, arranged on a circuit board, and comprising a first input port and a second input port;
    an output port;
    a fiber patch panel, arranged between the input assembly and the output port, and comprising two groups of first fiber patch slots and a plurality of second fiber patch slots, each of the groups comprising a plurality of first fiber patch slots;
    a plurality of first optical fibers, connected respectively to the first input port and the output port; and
    a plurality of second optical fibers, connected respectively to the second input port and the output port,
    wherein two of the first fiber patch slots are cooperated with one of the second fiber patch slot so that one of the first optical fibers and one of the second optical fibers respectively passing the two first fiber patch slots are arranged together in the one second fiber patch slot;
    wherein the two groups of first fiber patch slots are respectively disposed at two opposite sides of the circuit board first fiber patch slots and aligned to the first input port and the second input port respectively;
    wherein the first optical fibers are held in one of the groups and the second optical fibers are held in another of the groups of first fiber patch slots;
    wherein each of the first fiber patch slots contains only two of the first optical fibers, each of the second fiber patch slots contains only one of the first optical fibers and one of the second optical fibers together.

2. The optical transceiver according to claim 1, wherein one or all of the first fiber patch slots accommodates two of the first optical fibers, two of the second optical fibers, or one of the first optical fibers and one of the second optical fibers.

3. The optical transceiver according to claim 1, wherein a number of the first fiber patch slots and a number of the second fiber patch slots are unequal.

4. The optical transceiver according to claim 1, wherein at least one first guiding surface is disposed on an internal wall of one or all of the first fiber patch slots close to the second fiber patch slots, and the first guiding surface comprises a curved surface or an inclined surface; or at least one second guiding surface is disposed on an internal wall of one or all of the second fiber patch slots close to the first fiber patch slots, and the second guiding surface comprises a curved surface or an inclined surface.

5. An optical transceiver, comprising:
    a circuit board;
    an input assembly, arranged on the circuit board, and comprising a first input port and a second input port, wherein the first input port comprises a plurality of first input interfaces, the second input port comprises a plurality of second input interfaces;
    an output port, comprising a plurality of first output interfaces and a plurality of second output interfaces, wherein a horizontal position of one or all of the first output interfaces is different from a horizontal position of the second output interfaces when using a surface of the circuit board as a horizontal reference;
    a fiber patch panel, arranged between the input assembly and the output port, and comprising two groups of first fiber patch slots and a plurality of second fiber patch slots, each of the groups comprising a plurality of first fiber patch slots;
    a plurality of first optical fibers, connecting one of the first input interfaces and one of the first output interfaces corresponding with each other, and one or all of the first optical fibers passing through one of the first fiber patch slots and one of the second fiber patch slots; and
    a plurality of second optical fibers, connecting one of the second input interfaces and one of the second output interfaces corresponding with each other, and one or all of the second optical fibers passing through one of the first fiber patch slots and one of the second fiber patch slots,
    wherein, one of the second fiber patch slots accommodates one of the first optical fibers and one of the second optical fibers,
    wherein each first output interface and one of the second output interfaces corresponding thereto are aligned to one of the second fiber patch slots;
    wherein the two groups of first fiber patch slots are respectively disposed at two opposite sides of the circuit board first fiber patch slots and aligned to the first input port and the second input port respectively;
    wherein the first optical fibers are held in one of the groups and the second optical fibers are held in another of the groups of first fiber patch slots;
    wherein each of the first fiber patch slots contains only two of the first optical fibers, each of the second fiber patch slots contains only one of the first optical fibers and one of the second optical fibers together.

6. The optical transceiver according to claim 5, wherein a radius of curvature of one or all of the first optical fibers or the second optical fibers is equal to or greater than 5 mm.

7. The optical transceiver according to claim 5, wherein one or all of the first fiber patch slots accommodates two of the first optical fibers, two of the second optical fibers, or one of the first optical fibers and one of the second optical fibers.

8. The optical transceiver according to claim 5, wherein one or all of the first optical fibers or one or all of the second optical fibers linearly enter into a corresponding first fiber patch slot or linearly depart from a corresponding second fiber patch slot.

9. The optical transceiver according to claim 5, wherein a number of the first fiber patch slots and a number of the second fiber patch slots are unequal.

10. The optical transceiver according to claim 5, wherein at least one first guiding surface is disposed on an internal wall of one or all of the first fiber patch slots close to the second fiber patch slots, and the first guiding surface comprises a curved surface or an inclined surface.

11. The optical transceiver according to claim 5, wherein at least one second guiding surface is disposed on an internal wall of one or all of the second fiber patch slots close to the first fiber patch slots, and the second guiding surface comprises a curved surface or an inclined surface.

12. The optical transceiver according to claim 5, wherein an end of one or all of the first optical fibers and a corresponding first input interface are disposed integrally in the first input port; or an end of one or all of the second optical fibers and a corresponding second input interface are disposed integrally in the second input port.

13. An optical transceiver, comprising:
a circuit board;
an input assembly, arranged on the circuit board and comprising a first input port and a second input port, wherein the first input port comprises a plurality of first input interfaces, and the second input port comprises a plurality of second input interfaces;
an output port, comprising a plurality of the first output interfaces and a plurality of second output interfaces, wherein a virtual line connecting one of the first output interfaces and one of the second output interfaces corresponding with each other is substantially perpendicular to a surface of the circuit board;
a fiber patch panel, arranged between the input assembly and the output port, and comprising two groups of first fiber patch slots and a plurality of second fiber patch slots, each of the groups comprising a plurality of first fiber patch slots;
a plurality of first optical fibers, connecting one of the first input interfaces and one of the first output interfaces corresponding with each other, and one or all of the first optical fibers passing through one of the first fiber patch slots and one of the second fiber patch slots; and
a plurality of second optical fibers, connecting one of the second input interfaces and one of the second output interfaces corresponding with each other, and one or all of the second optical fibers passing through one of the first fiber patch slots and one of the second fiber patch slots,
wherein, one or all of the second fiber patch slots accommodate one of the first optical fibers and one of the second optical fibers,
wherein each first output interface and one of the second output interfaces corresponding thereto are aligned to one of the second fiber patch slots;
wherein the two groups of first fiber patch slots are respectively disposed at two opposite sides of the circuit board first fiber patch slots and aligned to the first input port and the second input port respectively;
wherein the first optical fibers are held in one of the groups and the second optical fibers are held in another of the groups of first fiber patch slots;
wherein each of the first fiber patch slots contains only two of the first optical fibers, each of the second fiber patch slots contains only one of the first optical fibers and one of the second optical fibers together.

14. The optical transceiver according to claim 13, wherein a radius of curvature of one or all of the first optical fibers or the second optical fibers is equal to or greater than 5 mm.

15. The optical transceiver according to claim 13, wherein one or all of the first fiber patch slots accommodates at least two of the first optical fibers, accommodate at least two of the second optical fibers, or accommodate one of the first optical fibers and one of the second optical fibers.

16. The optical transceiver according to claim 13, wherein one or all of the first optical fibers or one or all of the second optical fibers linearly enters into a corresponding first fiber patch slot or linearly departs from a corresponding second fiber patch slot.

17. The optical transceiver according to claim 13, wherein a number of the first fiber patch slots and a number of the second fiber patch slots are unequal.

18. The optical transceiver according to claim 13, wherein at least one first guiding surface is disposed on an internal wall of one or all of the first fiber patch slots close to the second fiber patch slots, and the first guiding surface comprises a curved surface or an inclined surface.

19. The optical transceiver according to claim 13, wherein at least one second guiding surface is disposed on an internal wall of one or all of the second fiber patch slots close to the first fiber patch slots, and the second guiding surface comprises a curved surface or an inclined surface.

20. The optical transceiver according to claim 13, wherein an end of one or all of the first optical fibers and a corresponding first input interface are disposed integrally in the first input port; or an end of one or all of the second optical fibers and a corresponding second input interface are disposed integrally in the second input port.

* * * * *